(12) United States Patent
Nakahashi

(10) Patent No.: US 6,910,295 B2
(45) Date of Patent: Jun. 28, 2005

(54) FREE-BENDING LURE

(75) Inventor: Takanari Nakahashi, Oyabe (JP)

(73) Assignee: Lucky Craft Co., Ltd., Toyama (JP)

( * ) Notice: Subject to any disclaimer, the term of this patent is extended or adjusted under 35 U.S.C. 154(b) by 0 days.

(21) Appl. No.: 10/628,039

(22) Filed: Jul. 26, 2003

(65) Prior Publication Data

US 2004/0148845 A1 Aug. 5, 2004

(51) Int. Cl.$^7$ ................................................ A01K 85/00
(52) U.S. Cl. ..................................... 43/42.15; 43/42.24
(58) Field of Search ............................ 43/42.02, 42.04, 43/42.15, 42.24

(56) References Cited

U.S. PATENT DOCUMENTS

| | | | | |
|---|---|---|---|---|
| 857,593 A | * | 6/1907 | Brown | 446/368 |
| 862,206 A | * | 8/1907 | Sillman | 446/368 |
| 1,109,439 A | * | 9/1914 | Maus | 43/42.15 |
| 2,069,972 A | * | 2/1937 | Schroeder | 43/42.15 |
| 2,481,789 A | * | 9/1949 | Smith | 43/42.15 |
| 2,932,112 A | * | 4/1960 | Graves, Jr. | 43/42.02 |
| 2,971,285 A | * | 2/1961 | Murawski | 43/35 |
| 3,380,184 A | * | 4/1968 | Fernandez | 43/26.2 |
| 3,440,757 A | * | 4/1969 | McClellan | 43/42.24 |
| 3,537,207 A | * | 11/1970 | McClellan et al. | 43/42.24 |
| 3,735,518 A | * | 5/1973 | Kleine et al. | 43/42.04 |
| 3,899,847 A | * | 8/1975 | Dworski | 43/42.09 |
| 3,992,800 A | * | 11/1976 | Neil | 43/42.24 |
| 4,893,430 A | * | 1/1990 | Barfield | 43/42.24 |
| 5,182,875 A | * | 2/1993 | Righetti | 43/42.24 |
| 6,662,487 B2 | * | 12/2003 | Perrone, Jr. | 43/42.04 |

* cited by examiner

*Primary Examiner*—Kurt Rowan
(74) *Attorney, Agent, or Firm*—Koda & Androlia

(57) ABSTRACT

A bendable lure including a lure main body that is formed by insert molding and is composed of a plurality of segments, which are disposed spacedly in a direction of the axis or length of the main body, and a flexible core member, which passes through the plurality of segments, so that the flexible core member can bend in gaps between the segments.

1 Claim, 3 Drawing Sheets

FREE-BENDING LURE

BACKGROUND OF THE INVENTION

1. Field of the Invention

The present invention relates to a lure and more particularly to a free-bending lure which is used as false bait for catching fish in lure fishing and which has a body that can be bent freely.

2. Prior Art

Lure fishing began in Europe in the 1700's when a fisherman accidentally dropped a spoon in a lake and found that trout came flying to this spoon. From that time until the present day, various lures have been devised, and many different types of lures have been proposed. The appeal of lure fishing is that fish can be caught using imitation bait (lures) instead of live bait or real non-live bait, so that the struggle with the fish can be enjoyed by selecting and operating different types of lures.

In regard to types of lures, there has been a great proliferation of types, in terms of color and shape, size, material, lures that float or sink, and lures that emit sounds, etc. In terms of shape, there are six main types of lures: spinners, spoons, spinner baits, plugs, jigs and soft lures used as lures that mimic the shapes of live bait such as shrimps, earthworms or insects. In terms of materials, there are three main types: metal, balsa/plastic and soft plastic (used for convenience of molding). Among these, only soft lures molded from soft plastics such as vinyl chloride have been available as false bait whose bodies can be freely bent in imitation of live bait.

Conventionally, as described above, lures whose bodies can be bent are deformable as a result of the use of a soft plastic material. However, because of the lack of strength, it has been impossible to attach hooks, etc. to the soft main body of such lures. Accordingly, in regard to hook attachment, it has been necessary to attach the hook directly to the fishing line along with the lure main body, and the position of the hook has been limited to the front end portion of the lure. In another method that has been used, the lure is integrally molded from a hard plastic and a soft plastic, and a fishing line connecting eye and a hook connecting eye are attached to the hard plastic portion. Even if this is done, however, difficulties still exist. The position of the hook is limited to the hard plastic portion; and if the hard plastic portion is formed over a long extent of the lure so that this limitation is avoided, then it becomes difficult to achieve overall deformation of the lure.

Furthermore, a lure in which a trunk and tail are connected by a metal fitting as a lure configuration that mimics a gold fish can be cited as one example of a lure that is close to a free-bending lure. In this case, however, the metal fitting consists of a pair of (eye-shaped) metal rings that are connected to each other. One metal ring of the metal fitting is insert-molded or screwed into the trunk, while the other metal ring is insert-molded or screwed into the tail, so that an integrated body is formed. Accordingly, the structure is complicated, and it is unsuitable for mass production. Furthermore, a large gap is unavoidably generated between the trunk and the tail as a result of the connecting structure of the two metal rings, and this prevents a fine connection. Consequently, such a structure is completely unsuitable for making a lure that is freely deformable in imitation of false bait by successively connecting a number of segments.

SUMMARY OF THE INVENTION

The present invention is devised in light of the problems described above.

The object of the present invention is to provide a free-bending lure which is capable of overall deformation in spite of the fact that the lure is made of a hard plastic, in which the eye attachment position is free and unrestricted and which furthermore has a simple structure and is therefore suitable for mass production.

The above object is accomplished by a unique structure for a free-bending lure which is characterized by the fact that the lure main body is formed by insert molding and is comprised of: a sequence of segments, which are formed by intermittent division into several segments with spaces left between these segments in the direction of the axis or length of the main body or in the direction of forward advancement of the main body of the lure, and a flexible core member, which passes through the series of segments is installed, so that the flexible core member can bend in the gaps between the segments.

With the structure described above, the free-bending lure has gaps between the respective segments, and these gaps can be set narrower or larger without restrictions by insert molding. Accordingly, the lure can be endowed overall with a free natural bending deformation so that a successive bending can be made in the connected numerous segments. Furthermore, since the respective segments are made of hard plastic, connection eyes for the fishing line and hook can be securely attached at any desired locations.

DETAILED DESCRIPTION OF THE INVENTION

Figure 1:
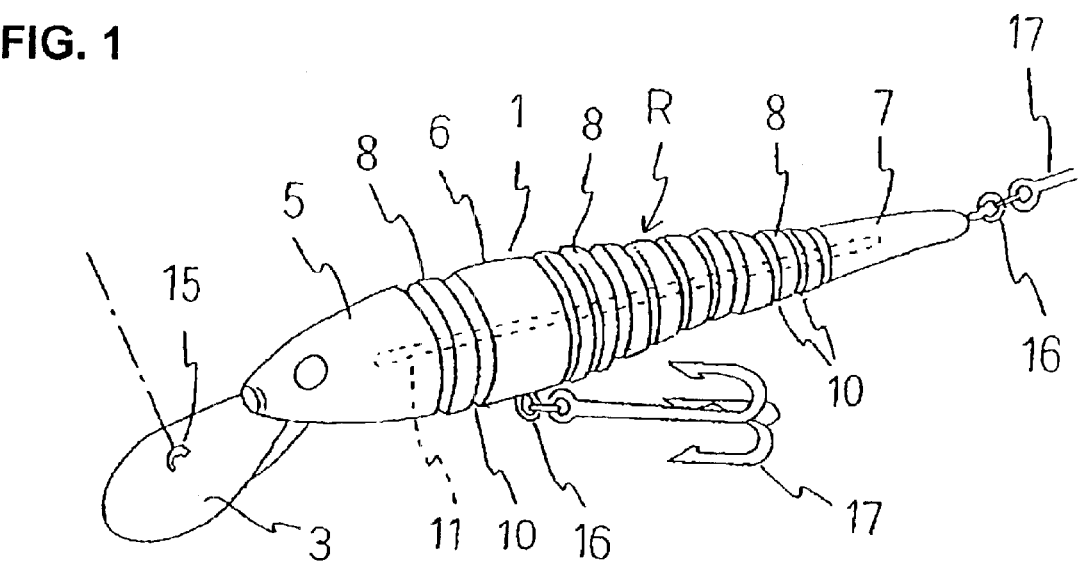
FIG. 1 is a perspective view of the free-bending lure according to the first embodiment of the present invention.

In the lure of the present invention, respective segments 5, 6, 7 and 8 that make the lure R are successively connected by a flexible core member 11 that passes through these segments so that the overall configuration (in shape, for instance) of the lure is obtained by the connection. There are no particular restrictions on the configuration of the lure, and novel types of lures not seen in the past can be realized. However, as an example of application to a conventional type, the present invention is effectively applicable to plugs which in the past did not show any movement.

Likewise, there are no particular restrictions on the material or shape of the flexible core member 11. As to the material, simple materials such as metals, special fibers, silicon or rubber, etc. or composite materials comprising such materials can be used. Furthermore, in regard to the shape of the core member, this member can have the form of a wire, sheet, tube, ring, etc.

When the flexible core member 11 is a wire member (or takes a wire shape), if this wire member is made of a plastic material, the wire member will bond with good affinity to the respective segments 5, 6, 7 and 8 at the time of insert molding, so that there is no absolute need for a special connecting means for connecting (or attaching) the segments 5, 6, 7 and 8 to the core member 11. However, when the flexible core member 11 in a wire shape is made of a material other than plastic and is made of a metal material, then stopper blocks 13 (see FIG. 3) are fastened to both ends of such a metal core member 11 so that the connection between the core member and the segments is reinforced. Furthermore, in order to prevent breakage caused by fatigue, cushion members 12 can be provided on the flexible core member 11 at the bending locations near both ends so that the cushion members 12 are exposed from the segments 5 and 7.

On the other hand, when the flexible core member 11 is a thin sheet-form member (or takes a plate shape), the connection of the respective segments 5, 6, 7 and 8 to the sheet-form core member 11 can be reinforced by holes 19 (which will be filled with plastic) formed in the flexible core member 11.

The flexible core member of a wire-shape can bend freely in all directions (vertically ((see dotted lines in FIG. 2)) and horizontally or laterally). However, when the flexible core member is in a sheet-form, then the core member can bend only in the direction of the two surfaces of the sheet, that is, it can bend only horizontally or laterally as shown by dotted lines in FIG. 5.

In the free-bending lure of the present invention, as described above, the lure can be flexibly deformed for its entirety even if it is made of a hard plastic, so that the lure can make the same bending and twisting movement as a bait animal that is being imitated. Accordingly, fish will mistake the lure for live bait and tend to strike at the lure. Furthermore, the attachment positions of connecting eyes for the fishing line and hooks can be freely set without any restrictions. In addition, since the lure can be simple in structure, the lure is suitable for mass production.

The present invention will be described below in more detail in terms of the embodiments. The following embodiments are mere examples, and it goes without saying that the present invention should not be restricted by the described embodiments.

Figure 2:
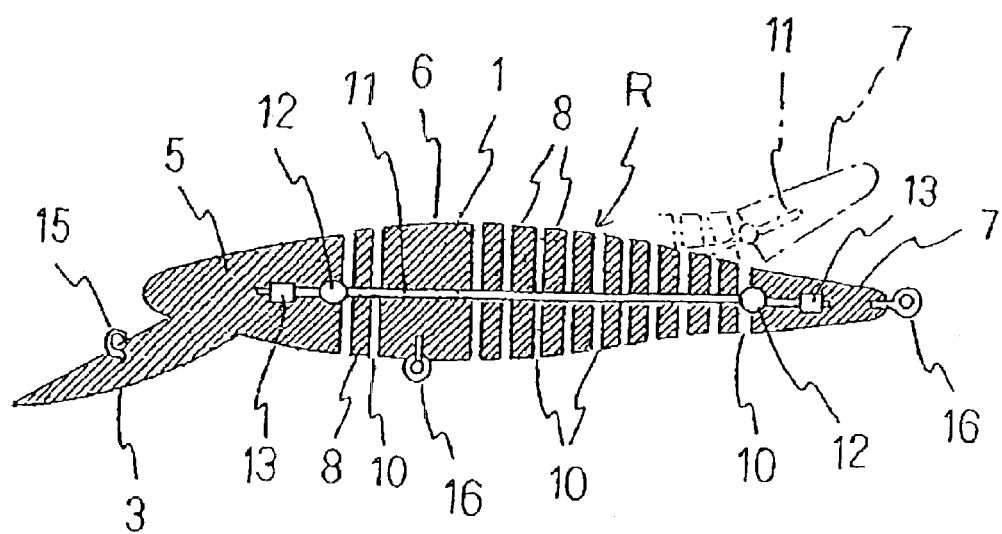
FIG. 2 is a longitudinal sectional view thereof.
Figure 3:
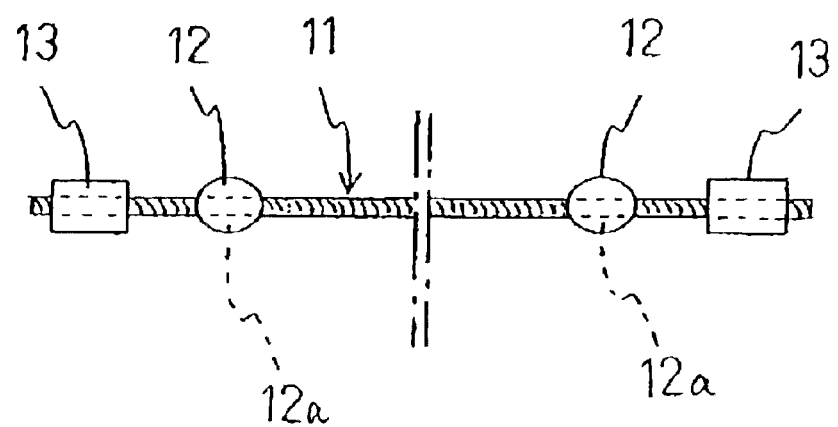
FIG. 3 is an enlarged sectional view of the flexible core member used in the lure of the first embodiment.

As seen from FIGS. 1 through 3, the embodiment is shown as an example in which the free-bending lure R is embodied as a lure resembling a plug that has a lip 3.

The main body 1 is generally comprised of a head segment 5, a trunk segment 6 and a tail segment 7. One interposing segment 8 is disposed between the head segment 5 and the trunk segment 6, and a plurality of interposing segments 8 are disposed between the trunk segment 6 and the tail segment 7. These segments 5, 6, 7 and 8 are connected in a series by a flexible core member 11 (being an insert) with substantially equal gaps or spaces 10 interspaced between the respective adjacent segments 5, 6, 7 and 8.

In the above lure R, the flexible core member 11 is a wire obtained by twisting fine thread-form metal wires. The lure R is made by insert-molding process; and a hard plastic melt is injected into a metal mold (not shown) with the wire (core member 11) set in the center of the cavity of the mold. In this case, the melt solidifies while being fixed to uneven outer surface of the wire, the segments 5, 6, 7 and 8 are securely held on the wire with gaps 10 being formed in between. Furthermore, since the metal stopper blocks 13 are provided by crimping at both ends of the wire as best seen from FIG. 3, and these stopper blocks are integrated inside the head segment 5 and tail segment 7, respectively. Accordingly, the overall combination of the segments 5, 6, 7 and 8 and the flexible core member 11 is securely held via the wire as a result of these blocks as well.

Oval (or football-shaped) cushion members 12 made of a rubber material are attached to both end portions of the wire or the flexible core member 11. The cushion members 12 have holes 12a so that the cushion members 12 are freely movable on the flexible core member 11. During insert molding, the respective cushion members 112 are positioned in the metal mold so that they are respectively in the inside surfaces of the head segment 5 and tail segment 7 that face each. In this way, the attachment root portions of the wire around which the head segment 5 and tail segment 7 turn are attached in a protected state; and extreme bending of the wire or the flexible core member 11 at the attachment root portions to the head segment 5 and tail segment 7 is suppressed by the cushion members 12.

An eye 15 for connecting a fishing line is attached to the lip 3 that forms an integral portion of the head segment 5; and eyes 16 for connecting hooks 17 are attached to the trunk segment 6 and tail segment 7.

Figure 4:
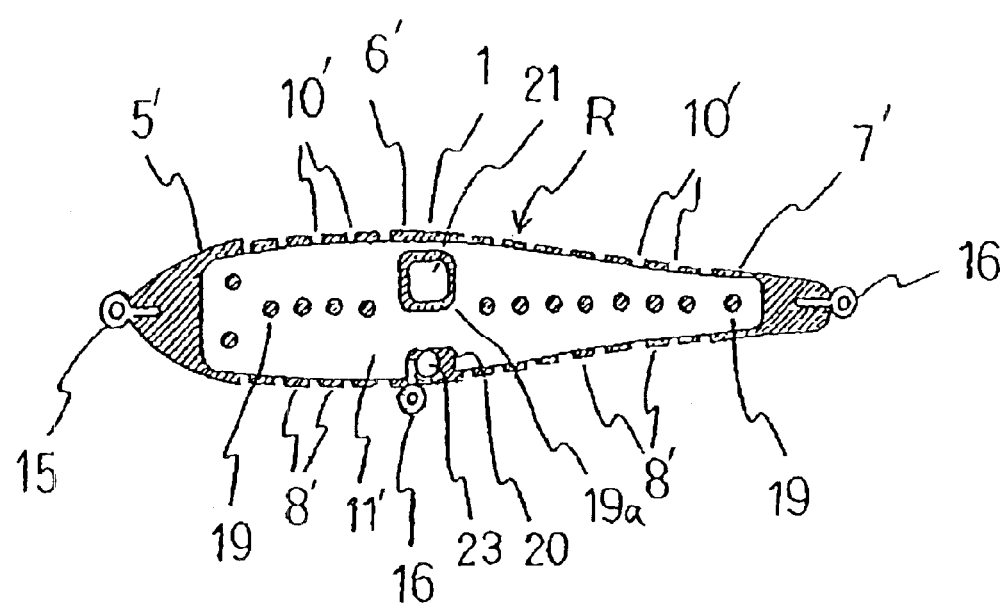
FIG. 4 is a longitudinal sectional view of the free-bending lure according to the second embodiment of the present invention.
Figure 5:
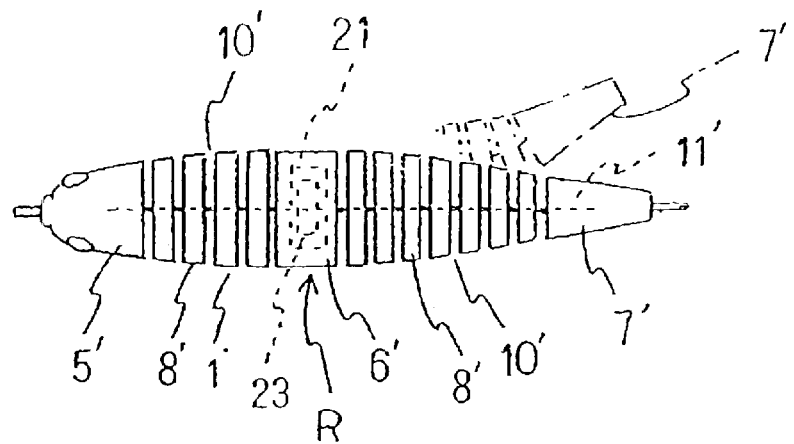
FIG. 5 is a top view of the second embodiment.

FIGS. 4 and 5 show an example in which the present invention is applied to a plug that has no lip. In this case, a thin metal sheet made of stainless steel is used as a flexible core member 11'.

In the lure R' of FIGS. 4 and 5 as well, the main body 1' includes a head segment 5', a trunk segment 6' and a tail segment 7' that are formed as relatively large parts in order to ensure the strength of the attachment of the eyes 15' and 16'. A plurality of interposing segments 8' are respectively disposed between the head segment 5' and the trunk segment 6' and between the trunk segment 6' and tail segment 7'; and these segments are connected by the thin metal sheet core member 11'. There are spaces 10' between the segments. In order to reinforce the connection of the segments to the core member, holes 19 are formed at positions that correspond to the respective segments 5', 6', 7' and 8', so that these holes 19 are filled with plastic by injection of the melt at the time of insert molding.

Furthermore, in the trunk segment 6', a large-sized hole 19a is formed in the upper part of the thin metal sheet core member 11', and a large-sized cut-out 20 is formed in the lower part of this thin metal sheet core member 11'. A float 21 is installed in the large-sized hole 19, and a weight 23 is installed in the cut-out 20. Eyes 15' and 16' are respectively attached to the head segment 5', trunk segment 6' and tail segment 7'.

Figure 6:
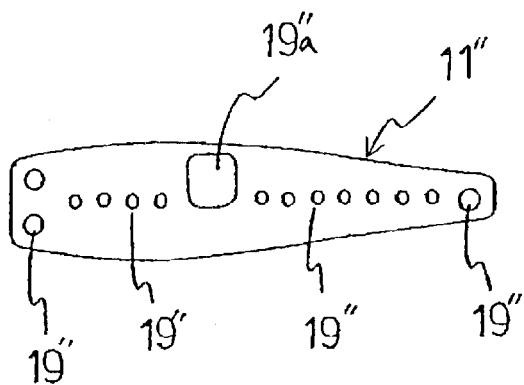
FIG. 6 is a front view of a flexible core member similar to the flexible core member used in the second embodiment.

FIG. 6 shows another example of a thin metal sheet core member 11 that is similar to the core member 11' of FIG. 4.

Figure 7:
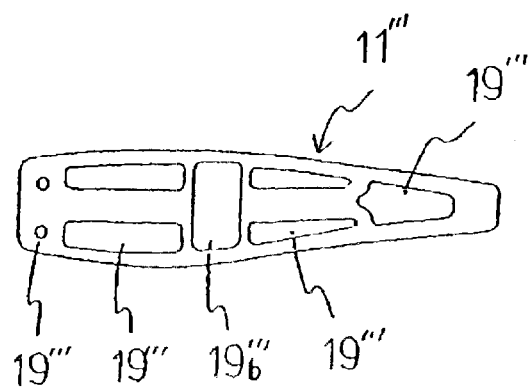
FIG. 7 is a front view of still another flexible core member of the second embodiment.

FIG. 7 shows another type of thin metal sheet core member 11'''.

In the thin metal sheet core member 11''' of FIG. 7, a plurality of holes 19''' are formed in the shape of rectangular that is longer in the direction of the length of the thin metal sheet core member 11'''. The hole 19b''' for the trunk segment (not shown) is formed in a rectangular shape having the longer sides in the vertical direction, so that a float and weight (not shown) can be installed in this rectangular hole 19b'''.

What is claimed is:

1. A free-bending lure wherein a lure main body thereof is formed by insert molding and is comprised of a plurality of segments, which are disposed spacedly in a direction of length of said main body, and a flexible core member, which passes through said plurality of segments; and said flexible core member is bendable in gaps between said segments, and wherein said flexible core member is a wire member that passes through a center of each of said segments, stopper blocks which are inserted into only end segments that are at both ends of said main body are provided at both end portions of said flexible core member so that said flexible core member is prevented from slipping out of said end segments, and cushion members which are partially inserted into said end segments and exposed in gaps between said end segments and an adjacent segment are provided on said flexible core, a shape of said cushion members selected from the group consisting of a sphere and oval.

* * * * *